US011946474B2

(12) United States Patent
Reynolds et al.

(10) Patent No.: US 11,946,474 B2
(45) Date of Patent: Apr. 2, 2024

(54) GAS TURBINE ENGINE WITH COMPRESSOR BLEED SYSTEM FOR COMBUSTOR START ASSIST

(71) Applicant: HONEYWELL INTERNATIONAL INC., Charlotte, NC (US)

(72) Inventors: Bruce David Reynolds, Chandler, AZ (US); Nick Nolcheff, Chandler, AZ (US); Mahmoud Mansour, Phoenix, AZ (US); Timothy Darling, Phoenix, AZ (US); Ernest Kurschat, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/450,840

(22) Filed: Oct. 14, 2021

(65) Prior Publication Data

US 2023/0122939 A1    Apr. 20, 2023

(51) Int. Cl.
| | | |
|---|---|---|
| *F02C 9/18* | (2006.01) | |
| *F01D 17/26* | (2006.01) | |
| *F01D 19/00* | (2006.01) | |
| *F02C 7/264* | (2006.01) | |
| *F04D 17/02* | (2006.01) | |

(52) U.S. Cl.
CPC .......... *F04D 17/025* (2013.01); *F01D 17/26* (2013.01); *F01D 19/00* (2013.01); *F02C 7/264* (2013.01); *F02C 9/18* (2013.01); *F05D 2240/11* (2013.01); *F05D 2270/80* (2013.01)

(58) Field of Classification Search
CPC ............. F04D 27/0207; F04D 27/0215; F04D 27/023; F04D 27/0238; F04D 17/025; F02C 6/08; F02C 9/18; F05D 2270/10; F05D 2270/101; F05D 2270/102
See application file for complete search history.

(56) References Cited

U.S. PATENT DOCUMENTS

| | | | |
|---|---|---|---|
| 8,112,983 B2 | 2/2012 | Bradbrook et al. | |
| 8,122,724 B2 * | 2/2012 | Slovisky | F04D 29/444 |
| | | | 60/240 |

(Continued)

FOREIGN PATENT DOCUMENTS

| | | |
|---|---|---|
| EP | 3106647 A1 | 12/2016 |
| EP | 3222854 A1 | 9/2017 |

*Primary Examiner* — Thuyhang N Nguyen
(74) *Attorney, Agent, or Firm* — Lorenz & Kopf LLC

(57) ABSTRACT

A gas turbine engine includes a combustor having a combustor air inlet, an axial-centrifugal compressor, a shroud, a secondary flow duct, and a valve. The shroud surrounds at least a portion of the axial-centrifugal compressor and has a surge bleed plenum defined therein that is in fluid communication with, and receives compressed air from, the axial compressor outlet. The secondary airflow duct has a duct inlet that is in fluid communication with the surge bleed plenum, and a duct outlet that is in fluid communication with the combustor air inlet. The valve is mounted on the secondary airflow duct and is movable between a closed position, in which the secondary airflow duct does not provide fluid communication between the surge bleed plenum and the combustor air inlet, and an open position, in which the secondary airflow duct provides fluid communication between the surge bleed plenum and the combustor air inlet.

12 Claims, 5 Drawing Sheets

(56) References Cited

U.S. PATENT DOCUMENTS

| | | | |
|---|---|---|---|
| 9,650,967 B2* | 5/2017 | DeFrancesco | F02C 7/185 |
| 10,760,491 B2* | 9/2020 | Suciu | F01D 17/105 |
| 10,907,834 B2 | 2/2021 | Park | |
| 2013/0000315 A1 | 1/2013 | Mowill | |
| 2016/0040599 A1 | 2/2016 | Chen | |
| 2018/0010520 A1 | 1/2018 | Iwasaki et al. | |
| 2018/0135525 A1* | 5/2018 | Morgan | F04D 29/321 |
| 2018/0347401 A1* | 12/2018 | Nolcheff | F02C 9/18 |
| 2022/0090507 A1* | 3/2022 | Erdmenger | F02C 9/18 |

* cited by examiner

GAS TURBINE ENGINE WITH COMPRESSOR BLEED SYSTEM FOR COMBUSTOR START ASSIST

TECHNICAL FIELD

The present disclosure generally relates to gas turbine engines, and more particularly relates to a gas turbine engine with a compressor bleed system for assisting in combustor starting.

BACKGROUND

The overall cycle pressure ratio in new-design gas turbine propulsion engines continues to increase. One advantage of increased overall cycle pressure ratio is that it provides increased engine performance One potential drawback is that an increased overall cycle pressure ratio also requires an increased high-pressure compressor pressure ratio. The drawback can evince itself during normal start or a windmill restart of an engine. In particular, compressors with the increased pressure ratios may generate relatively large front-to-rear stage off-design mismatching, resulting in less compressed airflow to the combustor during a start operation.

More specifically, during starting conditions, the high-pressure compressor is operating at relatively low speeds. At these relatively low speeds, the front (or upstream) stages of the high-pressure compressor may be operating near stall conditions, while the rear (or downstream) stages may be operating in choked conditions (i.e., pressure ratio less than 1.0). These conditions result in less compressed airflow, and in some cases insufficient compressed airflow, to the combustor to achieve start or restart conditions.

Hence, there is a need for a system and method that provides increased compressed airflow to the combustor during a normal start and/or a windmill restart of gas turbine engines equipped with high-pressure compressors having a relatively high pressure ratio. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a gas turbine engine includes a combustor having a combustor air inlet, an axial-centrifugal compressor, a shroud, a secondary flow duct, and a valve. The axial-centrifugal compressor is disposed upstream of the combustor and includes an axial compressor and a centrifugal compressor. The axial compressor has an axial compressor inlet and an axial compressor outlet, and the centrifugal compressor has a centrifugal compressor inlet and a centrifugal compressor outlet. The centrifugal compressor inlet is in fluid communication with the axial compressor outlet, and the centrifugal compressor outlet is in fluid communication with the combustor air inlet. The shroud surrounds at least a portion of the axial-centrifugal compressor and has a surge bleed plenum defined therein that is in fluid communication with, and receives compressed air from, the axial compressor outlet. The secondary airflow duct has a duct inlet and a duct outlet. The duct inlet is in fluid communication with the surge bleed plenum, and the duct outlet is in fluid communication with the combustor air inlet. The valve is mounted on the secondary airflow duct and is movable between a closed position, in which the secondary airflow duct does not provide fluid communication between the surge bleed plenum and the combustor air inlet, and at least one open position, in which the secondary airflow duct provides fluid communication between the surge bleed plenum and the combustor air inlet.

In another embodiment, a gas turbine engine includes a housing, a shaft assembly rotationally mounted within the housing, a combustor having a combustor air inlet, an axial-centrifugal compressor, a shroud, a secondary airflow duct, and a valve. The axial-centrifugal compressor is mounted on and is coupled for rotation with the shaft assembly. The axial-centrifugal compressor is disposed upstream of the combustor and includes an axial compressor and a centrifugal compressor. The axial compressor has an axial compressor inlet and an axial compressor outlet and a plurality of axial stages, wherein each of the plurality of axial stages comprises at least one stator assembly and a rotor assembly operably coupled to the shaft assembly for rotation relative to the stator assembly. The centrifugal compressor has a centrifugal compressor inlet and a centrifugal compressor outlet. The centrifugal compressor inlet is in fluid communication with the axial compressor outlet, and the centrifugal compressor outlet is in fluid communication with the combustor air inlet. The shroud surrounds at least a portion of the axial-centrifugal compressor and has a surge bleed plenum defined therein that is in fluid communication with, and receives compressed air from, the axial compressor outlet. The secondary airflow duct has a duct inlet and a duct outlet. The duct inlet is in fluid communication with the surge bleed plenum, and the duct outlet is in fluid communication with the combustor air inlet. The valve is mounted on the secondary airflow duct and is movable between a closed position, in which the secondary airflow duct does not provide fluid communication between the surge bleed plenum and the combustor air inlet, and at least one open position, in which the secondary airflow duct provides fluid communication between the surge bleed plenum and the combustor air inlet.

In yet another embodiment, a method of controlling compressed airflow in a gas turbine engine that includes a combustor, an axial-centrifugal compressor disposed upstream of the combustor and having an axial compressor and a centrifugal compressor, and a shroud that surrounds at least a portion of the axial compressor and has a surge bleed plenum defined therein, wherein the combustor has a combustor air inlet, wherein the axial compressor has an axial compressor inlet and an axial compressor outlet, wherein the centrifugal compressor has a centrifugal compressor inlet in fluid communication with the axial compressor outlet and a centrifugal compressor outlet in fluid communication with the combustor air inlet, and wherein the surge bleed plenum is in fluid communication with, and receives compressed air from, the axial compressor outlet. The method includes providing a secondary airflow duct having a duct inlet and a duct outlet, where the duct inlet is in fluid communication with the surge bleed plenum and the duct outlet in fluid communication with the combustor air inlet, and selectively moving a valve that is mounted on the secondary airflow duct between a closed position, in which the secondary airflow duct does not provide fluid communication between the surge bleed plenum and the combustor air inlet, and at least one open position, in which the secondary airflow duct provides fluid communication between the surge bleed plenum and the combustor air inlet.

Furthermore, other desirable features and characteristics of the gas turbine engine and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
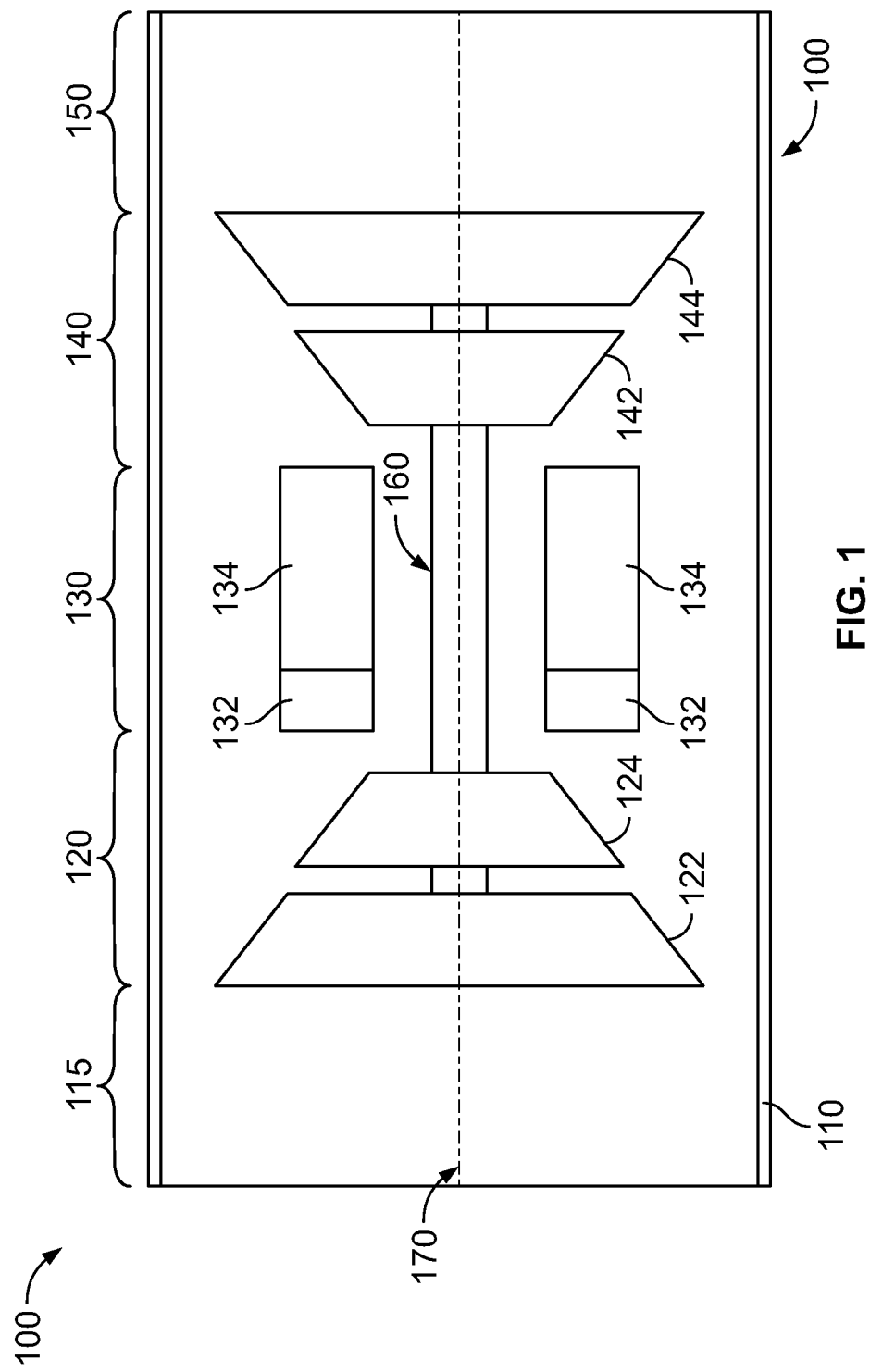
FIG. 1 depicts a simplified cross-sectional view of one embodiment of a gas turbine engine.

Referring to FIG. 1, a simplified cross-sectional view of one embodiment of a gas turbine engine 100 is depicted. The engine 100 is disposed in an engine housing 110 and includes an intake section 115, a compressor section 120, a combustion section 130, a turbine section 140, and an exhaust section 150. The compressor section 120 and turbine section 140 are operably coupled to a shaft assembly 160 for rotation within the housing 110. A fluid (e.g., air) is drawn into the engine housing 110 through the intake section 115 and into the compressor section 120. The compressor section 120 is configured as an axial-centrifugal compressor and thus includes an axial compressor 122 and a centrifugal compressor 124. Together, these compressors 122, 124 compress, and thus increase the pressure of, the fluid entering the engine 100 and supply the compressed fluid into the combustion section 130.

The combustion section 130 includes a combustor air inlet 132 and a combustion chamber 134. The combustor air inlet 132 is in fluid communication with the axial-centrifugal compressor 120, and it directs the compressed fluid into the combustion chamber 134. In the combustion chamber 134, the compressed fluid is mixed with fuel and is combusted in the combustion chamber 134. Hot exhaust fluids are then directed into the turbine section 140.

The hot exhaust fluids expand through, and rotate, the turbine section 140 prior to being exhausted through the exhaust section 150. The turbine section 140 rotates to drive equipment in the engine 100 via rotors or spools concentrically disposed about an axis of rotation 170 within the shaft assembly 160. Specifically, the turbine section 140 may include one or more rotors 142, 144 driven by the expanding hot exhaust fluids to rotate the shaft assembly 160 and drive the axial and centrifugal compressors 122, 124.

Before proceeding further, it is noted that although FIG. 1 depicts an exemplary configuration of the axial-centrifugal compressor 120 in a turboshaft gas turbine engine, other embodiments may have alternate configurations. Thus, the exemplary embodiments discussed herein are not intended to be limited to a turboshaft gas turbine engine, but rather may be readily adapted for use in other types of gas turbine engines including but not limited to turbofan and turboprop gas turbine engines.

Figure 2:
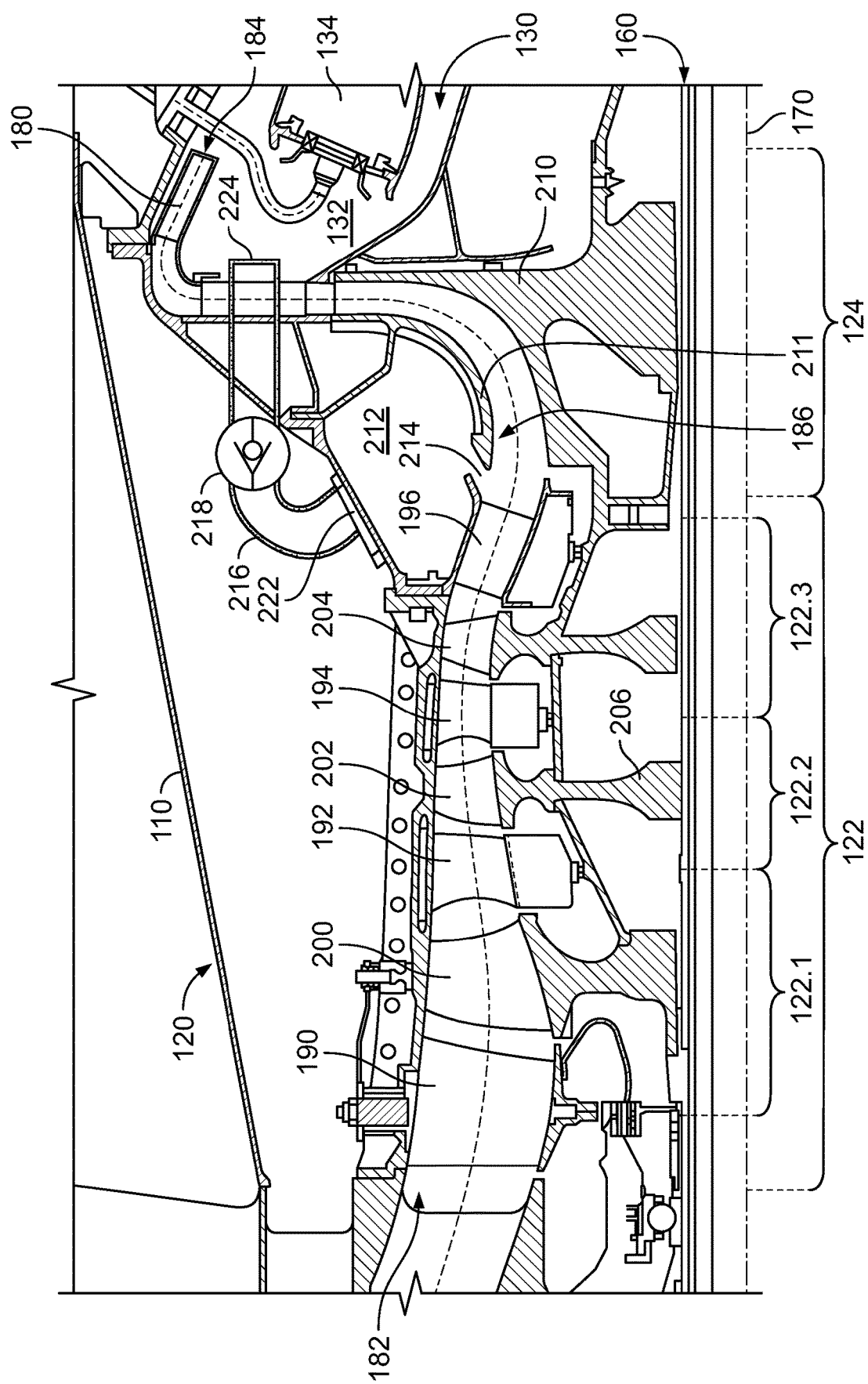
FIGS. 2 and 3 depict more detailed partial cross-sectional views of the axial-centrifugal compressor and other portions of the engine depicted in FIG. 1, including different embodiments of a bypass flow system included in the engine.

Returning to the description, and with reference now to FIG. 2, a more detailed partial cross-sectional view of the axial-centrifugal compressor 120 and a portion of the shaft assembly 160 of the engine 100 shown in FIG. 1 is depicted. In FIG. 2, only half the cross-sectional view of the axial-centrifugal compressor 120 is shown; the other half would be substantially rotationally symmetric about a centerline and the axis of rotation 170. Additionally, certain aspects of the engine 100 may not be shown in FIG. 2, or only schematically shown, for clarity in the relevant description of exemplary embodiments.

The axial-centrifugal compressor 120 defines a mean-line flow path 180 (indicated by the long dash—short dash—short dash line) from an axial compressor inlet 182, through the axial compressor 122 and the centrifugal compressor 124, to a centrifugal compressor outlet 184. The compressor outlet 184 is in fluid communication with the combustion section 130 (only partially shown in FIG. 2). The axial compressor 122 leads into the centrifugal compressor 124 such that an outlet 186 of the axial compressor 122 is in fluid communication with an inlet 186 of the centrifugal compressor 124. One skilled in the art will understand that FIG. 2 illustrates a simplified cross-section through the axial-centrifugal compressor 120, and that other features may be included in the axial-centrifugal compressor 120 along the flow path 180 as dictated by the specification and constraints associated with a particular intended use and without departing from the spirit and scope of the subject matter disclosed and claimed herein.

As is generally known, the axial compressor 122 progressively compresses fluids flowing generally axially (i.e., parallel to axis 170) along the flow path 180. To do so, the axial compressor 122 includes one or more axial compressor stages 122.1, 122.2, 122.3. For example, as shown in FIG. 2, the axial compressor 122 includes one or more inlet guide vanes 190 and one or more stator assemblies 192, 194, 196 and one or more rotor assemblies 200, 202, 204. The stator assemblies 192, 194, 196 may include a plurality of stator vanes arranged in one or more vane rows which are stationary with respect to the engine housing 110 and function to diffuse and direct the fluid through the flow path 180. The rotor assemblies 200, 202, 204 include a plurality of rotor blades that extend from a rotor hub 206 into the flow path 180 and that are rotatably driven on the shaft assembly 160. As the rotor assemblies 200, 202, 204 rotate, the fluid flowing across each rotor assembly 200, 202, 204 is incrementally compressed along the flow path 180. One skilled in the art will understand that the present disclosure is not limited to the specific number and arrangement of stator and rotor assemblies illustrated in FIG. 2, and that other configurations for the axial compressor 122 are contemplated within the scope of the subject matter described and claimed herein. Modifications may include but are not limited to the use of multiple stators or double row stators within a given axial compressor stage, variable stator vanes, or struts.

The centrifugal compressor 124 compresses the fluid and directs the flow radially outward (i.e., in a direction which increases in a radial direction away from the axis 170) through an impeller assembly 210 that is driven by the shaft assembly 160. The rotor assemblies 200, 202, 204 and the impeller assembly 210 shown in FIG. 2 are coupled to a common drive shaft for co-rotation. However, one skilled in the art will understand that other drive shaft configurations may be used for operably coupling the axial compressor 122 and the centrifugal compressor 124 at various drive ratios. For example, one or more of the rotor assemblies 200, 202, 204 may be coupled for co-rotation, while the remaining rotor assemblies 200, 202, 204 and the impeller assembly 210 are not coupled for co-rotation. Alternately, one or more rotor assemblies 200, 202, 204 and the impeller assembly 210 may be coupled for co-rotation. Alternately, the shaft assembly 160 may include counter rotating shafts for the axial compressor 124 and the centrifugal compressor 126, or for the various axial compressor stages 122.1, 122.2, 122.3.

As FIG. 2 also depicts, the engine 100, and more specifically the axial-centrifugal compressor 120, additionally includes a shroud 211. The shroud 211 surrounds at least a portion of the axial-centrifugal compressor 120 and has a surge bleed plenum 212 defined therein. The surge bleed plenum 212 is in fluid communication with the axial compressor outlet 186 via, for example, a plenum inlet 214 that is formed in the shroud 211. The surge bleed plenum 212 thus receives compressed air from the axial compressor outlet 186 during operation of the engine 100.

A surge bleed plenum 212 that receives compressed air from the axial compressor outlet 186 is not new in the gas turbine engine field. However, what was heretofore unknown, and which is also depicted in FIG. 2, is to include the depicted secondary airflow duct 216 and valve 218. The secondary airflow duct 216 has a duct inlet 222 and a duct outlet 224. The duct inlet 222 is in fluid communication with the surge bleed plenum 212, and the duct outlet 224 is in fluid communication with the combustor air inlet 132.

The valve 218 is mounted on the secondary airflow duct 216 and movable between a closed position and at least one open position. In the closed position, the secondary airflow duct does not provide fluid communication between the surge bleed plenum 212 and the combustor air inlet 132. Conversely, in any open position, the secondary airflow duct 216 does provide fluid communication between the surge bleed plenum 212 and the combustor air inlet 132.

The valve 218 may be implemented using a passively actuated valve or it may be an actively actuated valve. For example, the valve 218 may be implemented using a pressure actuated check valve. With this implementation, the valve 218 is configured to move from the closed position to an open position, and thus allow compressed air to flow from the surge bleed plenum 212 to the combustor inlet 132, when the pressure differential between the surge bleed plenum 212 and the combustor air inlet 132 (i.e., $P_{SurgePlenum} - P_{CombustorInlet}$) exceeds a first predetermined value. The valve 218 is additionally configured to move back to the closed position when the differential pressure is reduced below a second predetermined magnitude that is less than or equal to the first predetermined value.

Figure 3:
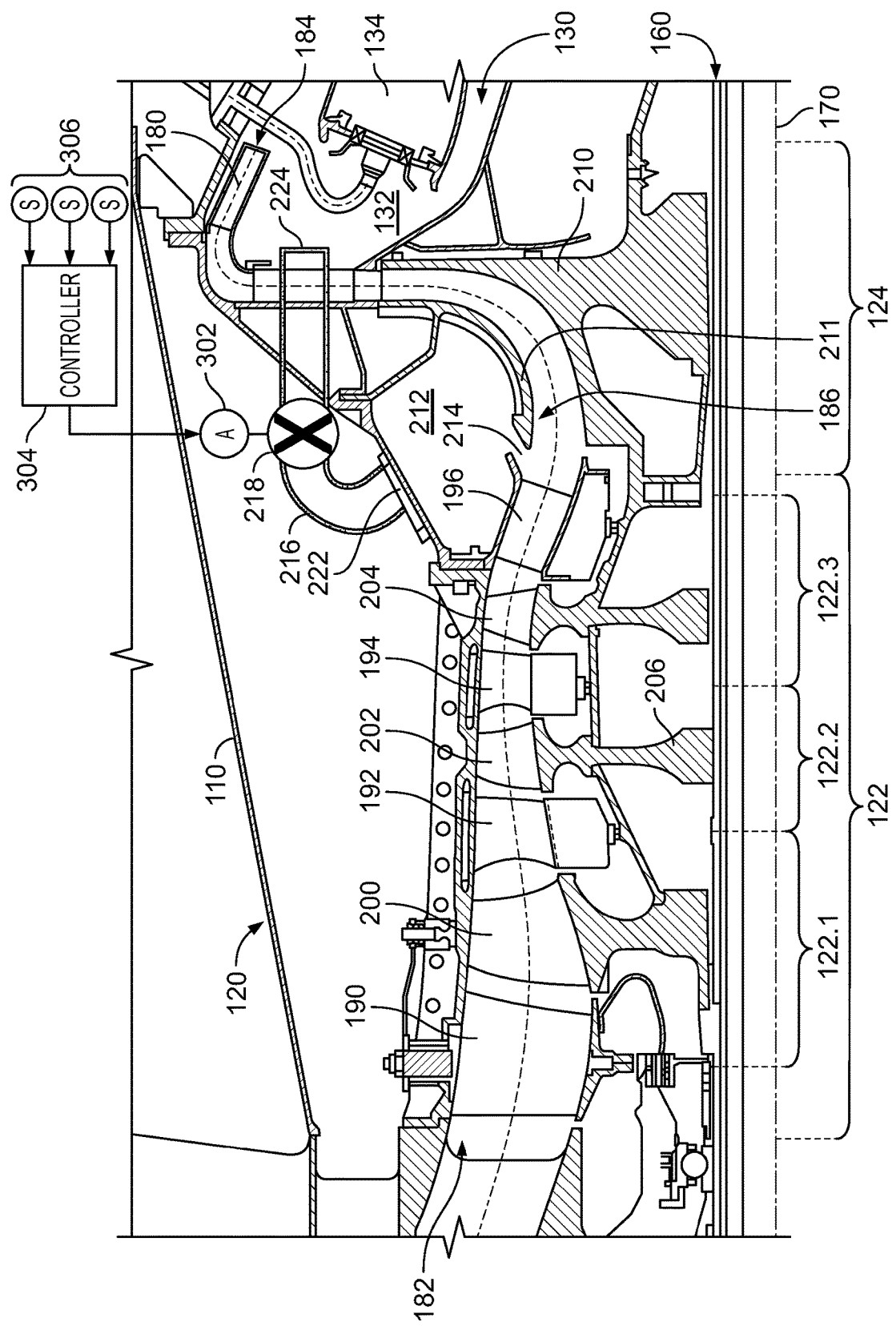

Referring to FIG. 3, it is seen that when the valve 218 is implemented using an actively actuated valve, the engine 100 additionally includes a valve actuator 302 and a controller 304. The valve actuator 302 is coupled to the valve 218 and the controller 304 is in operable communication with the valve actuator 302. The controller 304 is configured to supply valve position commands to the valve actuator 302, and the valve actuator 302 is responsive to the valve position commands to move the valve 218 between the closed position and the at least one open position.

It will be appreciated that the valve actuator 302 may be implemented using any one of numerous types of actuators including, but not limited to, various types of electrical, hydraulic, pneumatic, electrohydraulic, and electropneumatic types of actuators, just to name a few. It will additionally be appreciated that the controller 304 may be implemented as a stand-alone, application-specific controller, or its functionality may be implemented in another controller such as, for example, an electronic engine controller (EEC) or a full authority digital engine controller (FADEC), just to name a few.

No matter how the controller 304 is specifically implemented, it is seen that, at least in some embodiments, the engine 100 may also include one or more sensors 306 to sense various engine parameters and supply sensor signals indicative of the sensed parameters to the controller 304. The controller 304, in such embodiments, is configured to process the one or more sensor signals to generate the valve position commands supplied to the valve actuator 302. The number and type of sensed parameters may vary. Some non-limiting examples include one or more of surge plenum pressure ($P_{SurgePlenum}$), combustor inlet pressure ($P_{CombustorInlet}$), surge plenum-to-combustion inlet differential pressure ($\Delta P_{SP-CI}$), and/or compressor rotational speed (Ne), just to name a few.

Regardless of whether the valve 218 is implemented using a passively actuated valve or an actively actuated valve, under start and/or windmilling restart conditions, if engine conditions are such that compressed airflow to the combustor inlet 132 may be insufficient to achieve sustained combustion, the valve 218 will move (or be commanded to move) from the closed position to an open position, which may be a full-open position or a position between the closed and full-open position. With the valve 216 in an open position, the surge bleed plenum 212 will be in fluid communication with the combustor air inlet 132 via the secondary airflow duct 216. As a result, a fraction of the compressed air that is discharged from the axial compressor outlet and supplied to the surge plenum 212 bypasses the centrifugal compressor 124 and flows into the combustor air inlet 132. This additional compressed airflow improves the starting capability of the engine 100. After the engine 100 has achieved sustained combustion, but before it reaches idle power, the valve 218 is moved back to the closed position to allow normal engine operation.

Figure 4:
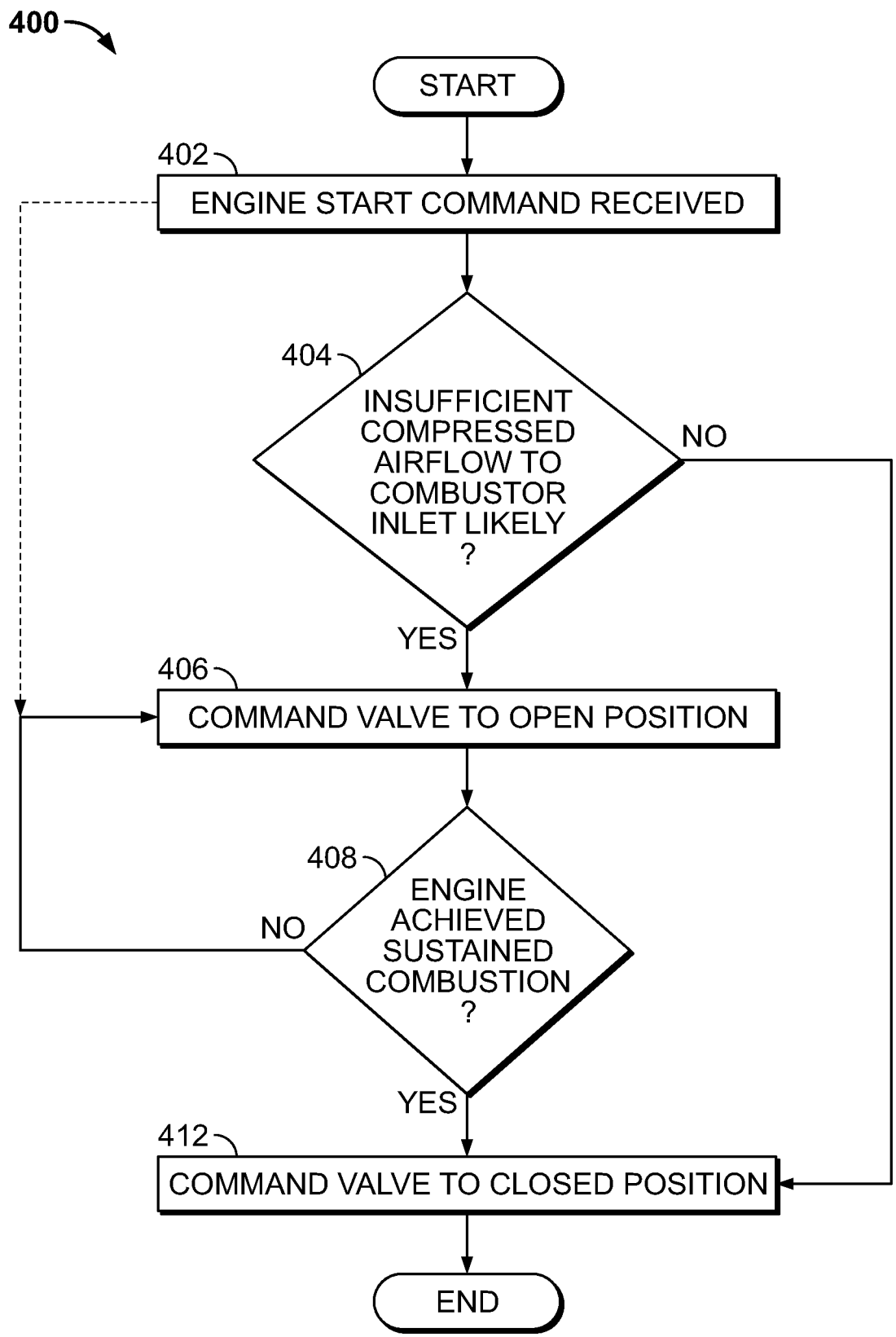
FIG. 4 depicts a method, in flowchart form, that may be implemented in a controller that is depicted in FIG. 3.

For those embodiments that include the controller 304, one embodiment of a method implemented in the controller 304 is depicted, in flowchart form in FIG. 4, and will now be described. The method 400 begins when the controller 304 receives, either directly or indirectly, an engine start command (402). The controller 304 then, based on one or more sensor signals supplied from the one or more sensors 306, determines if the engine conditions are such that insufficient compressor airflow to the combustor inlet 132 is likely (404). If not, then the valve 218 is commanded to remain closed (412). If so, however, the controller 304 commands the actuator 302 to move the valve 216 to an open position (406). The controller 304 continues to command the actuator 302 to keep the valve 216 in an open position until, based on the one or more sensor signals supplied from the one or more sensors 306, it determines that the engine 100 has achieved sustained combustion (408). Thereafter, the controller 304 commands the actuator 302 to move the valve 216 to the closed position. It should be noted that in some embodiments, the system may be configured such that, upon receipt of an engine start command (402), the valve 218 is always commanded to an open position (406). This configuration is depicted in FIG. 4 using a dashed line.

Figure 5:
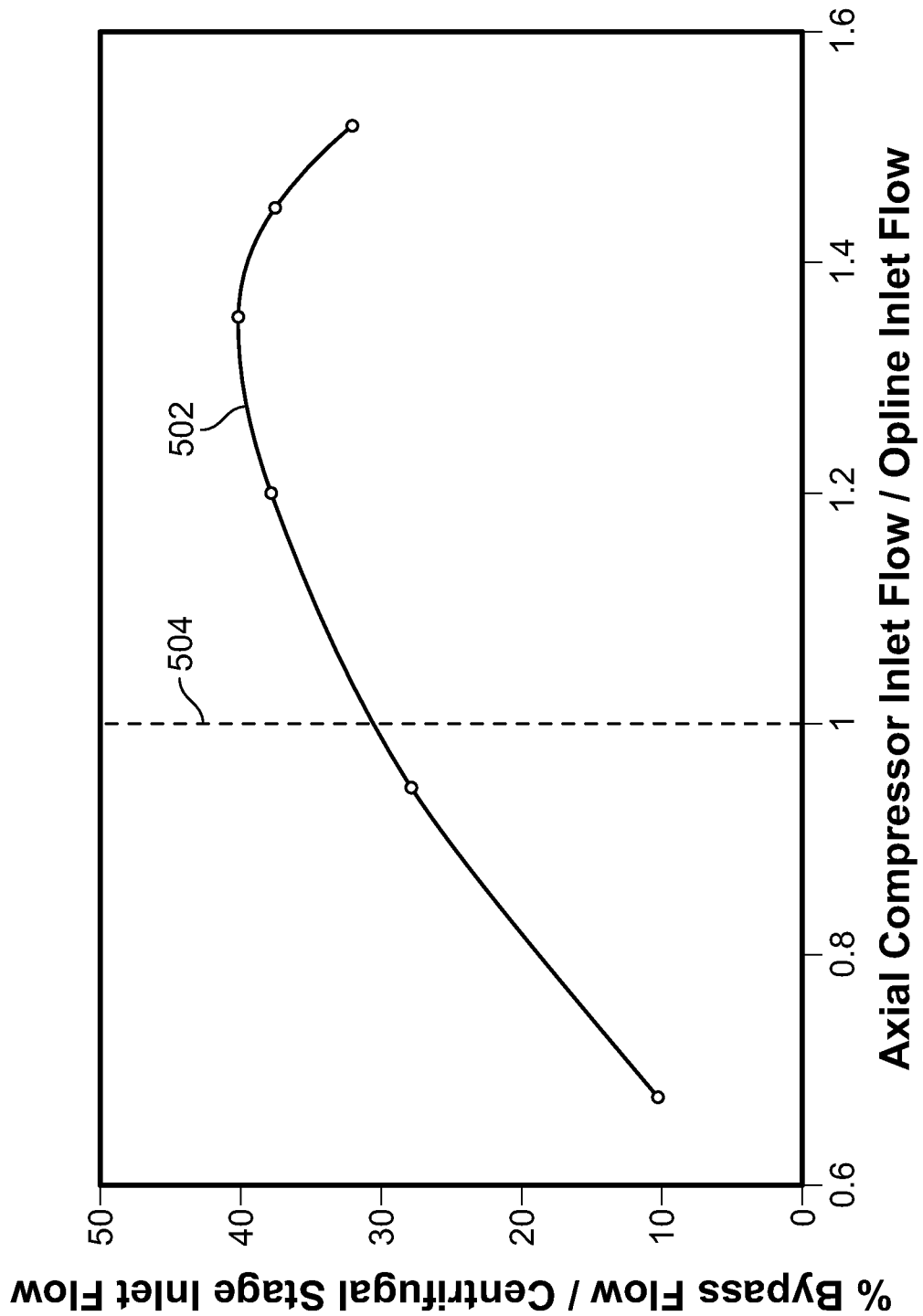
FIG. 5 graphically depicts computational fluid dynamic results for one embodiment of the engine and systems of FIGS. 1-3.

Computational fluid dynamics of the system 100 depicted and described herein provides surprising and unexpected results. In particular, the results graphically depicted in FIG. 5 are for a system 100 in which the cross-sectional flow area of the secondary flow duct 216 is set to about 10% of the flow area of the axial compressor outlet 186, and the rotational speed of the high-pressure compressor is set to 11% of full speed. For this configuration and speed, the results indicate that compressed airflow through the secondary flow duct 216 (curve 502) ranges from 10% of centrifugal compressor inlet flow to about 40% of centrifugal compressor inlet flow, achieving 30% on the compressor operating line 504. The variation in bypass flow level results from the variation in centrifugal compressor diffuser aerodynamic choking from high flow to low flow conditions on the speed line. This choking flow condition creates additional pressure loss for the centrifugal compressor and plays a key role in the bypass flow having sufficient pressure to provide increased airflow to the combustor during starting conditions. In this case, this is more than sufficient compressed airflow to ensure the engine 100 will light off during normal starts and/or windmill restarts.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling compressed airflow in a gas turbine engine that includes a combustor, an axial-centrifugal compressor disposed upstream of the combustor and having an axial compressor and a centrifugal compressor, and a shroud that surrounds at least a portion of the axial compressor and has a surge bleed plenum defined therein, wherein the combustor has a combustor air inlet, wherein the axial compressor has an axial compressor inlet and an axial compressor outlet, wherein the centrifugal compressor has a centrifugal compressor inlet in fluid communication with the axial compressor outlet and a centrifugal compressor outlet in fluid communication with the combustor air inlet, and wherein the surge bleed plenum is in fluid communication with, and receives compressed air from, the axial compressor outlet, the method comprising the steps of:

providing a secondary airflow duct having a duct inlet and a duct outlet, where the duct inlet is in continuous fluid communication with the surge bleed plenum and the duct outlet is in continuous fluid communication with the combustor air inlet; and selectively moving a valve that is mounted on the secondary airflow duct between a closed position, in which compressed air from the axial compressor outlet cannot flow, via the surge bleed plenum, through the secondary airflow duct and into the combustor air inlet, and at least one open position, in which compressed air from the axial compressor outlet flows, via the surge bleed plenum, through the secondary airflow duct and into the combustor air inlet.

2. The method of claim 1, wherein the step of selectively moving the valve comprises supplying valve position commands to a valve actuator that is coupled to the valve and that is responsive, to the valve position commands, to move the valve between the closed position and the at least one open position.

3. The method of claim 2, wherein the valve actuator is selected from the group consisting of an electrical actuator, a hydraulic actuator, a pneumatic actuator, an electrohydraulic actuator, and an electropneumatic actuator.

4. The method of claim 2, further comprising:
supplying the valve position commands to the valve actuator from a controller that is in operable communication with the valve actuator.

5. The method of claim 4, wherein the controller is an engine controller.

6. The method of claim 4, further comprising:
supplying sensor signals, each indicative of a sensed engine parameter, from a plurality of sensors disposed within the gas turbine engine to the controller.

7. The method of claim 1, wherein the valve is a pressure actuated check valve.

8. The method of claim 1, wherein the axial compressor comprises a plurality of axial stages.

9. The method of claim 8, wherein each of the plurality of axial stages comprises at least one stator assembly and a rotor assembly operably coupled to a shaft assembly for rotation relative to the stator assembly.

10. The method of claim 9, wherein at least two of the plurality of blade assemblies are coupled for co-rotation on the shaft assembly.

11. The method of claim 1, wherein a shaft assembly is operably coupled to the axial compressor and the centrifugal compressor for co-rotation thereof.

12. The method of claim 11, wherein:
the axial compressor comprises a plurality of axial stages; and
at least one of the plurality of axial stages is coupled for co-rotation with the centrifugal compressor section.

\* \* \* \* \*